United States Patent
Bagrodia et al.

(10) Patent No.: US 6,337,046 B1
(45) Date of Patent: *Jan. 8, 2002

(54) PROCESS FOR PRODUCING CONTAINERS FROM POLYMER/PLATELET PARTICLE COMPOSITIONS

(75) Inventors: Shriram Bagrodia; John Walker Gilmer; Kab Sik Seo; Sam Richard Turner, all of Kingsport, TN (US)

(73) Assignee: Eastman Chemical Company, Kingsport, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,670

(22) Filed: Dec. 22, 1997

(51) Int. Cl.[7] .............................. B29C 49/04; B29B 7/00
(52) U.S. Cl. ................... 264/540; 264/523; 264/532; 264/537; 264/328.18; 264/349
(58) Field of Search ........................ 264/523, 532, 264/537, 540, 328.18, 349

(56) References Cited

U.S. PATENT DOCUMENTS

| | | | |
|---|---|---|---|
| 4,071,503 A | * 1/1978 | Thomas et al. | 264/540 |
| 4,219,527 A | * 8/1980 | Edelman | 264/540 |
| 4,889,885 A | 12/1989 | Usaki et al. | |
| 5,102,948 A | 4/1992 | Deguchi et al. | |
| 5,149,485 A | * 9/1992 | Belcher | 264/540 |
| 5,273,706 A | * 12/1993 | Laughner | 264/540 |
| 5,514,734 A | * 5/1996 | Maxfield et al. | 523/204 |
| 5,552,469 A | 9/1996 | Beall et al. | |
| 5,578,672 A | 11/1996 | Beall et al. | |
| 5,648,159 A | * 7/1997 | Sato | 428/327 |
| 5,747,560 A | * 5/1998 | Christiani et al. | 523/209 |

FOREIGN PATENT DOCUMENTS

| | | |
|---|---|---|
| EP | 0 261 430 A2 | 3/1988 |
| EP | 0 650 994 A2 | 5/1995 |
| EP | 0 747 451 A2 | 12/1996 |
| EP | 0 780 340 A1 | 6/1997 |
| JP | 9-176461 | 7/1997 |
| WO | WO 93/04117 | 3/1993 |
| WO | WO 93/04118 | 3/1993 |
| WO | WO 93/11190 | 6/1993 |
| WO | WO 93/14922 A1 | 8/1993 |
| WO | WO 94/29378 A1 | 12/1994 |
| WO | WO 97/31057 | 8/1997 |
| WO | WO 97/31973 | 9/1997 |

OTHER PUBLICATIONS

Ser. No. 609,197, Evans et al., filed Mar. 1, 1996.

* cited by examiner

Primary Examiner—Jan H. Silbaugh
Assistant Examiner—Suzanne E McDowell
(74) Attorney, Agent, or Firm—Karen A. Harding Esq.; Bernard J. Graves, Jr., Esq.

(57) ABSTRACT

The present invention relates to new polyester compositions, novel processes to prepare molded articles from these new polyester compositions, and novel containers fabricated from polyester/clay composites for food and beverages. The processing methods employed in this invention enable containers to be formed which exhibit excellent clarity. Specifically, the present invention relates to a process comprising forming a parison from a composite composition comprising about 0.01 to about 25 weight % platelet particles dispersed in at least one polyester at a processing temperature which is at least 50° above the Tg of said polyester; and molding said parison into a clear, thin walled article.

18 Claims, 2 Drawing Sheets

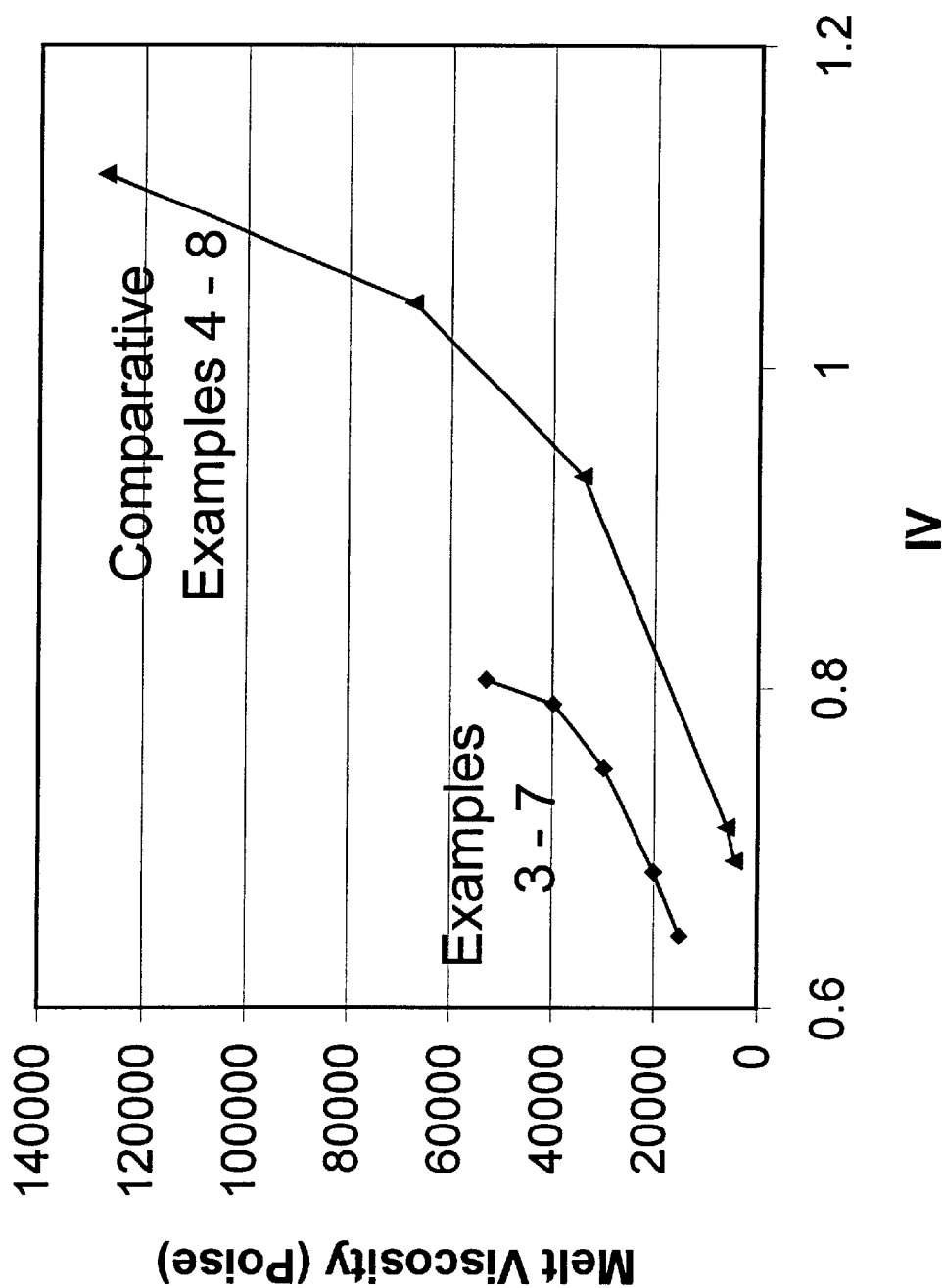

PROCESS FOR PRODUCING CONTAINERS FROM POLYMER/PLATELET PARTICLE COMPOSITIONS

BACKGROUND OF INVENTION

Polyesters such as poly(ethylene terephthalate) (PET) are widely used in bottles and containers for carbonated beverages, fruit juices, and certain foods. Because of the limited barrier properties of polyesters with regard to oxygen and other gases, polyester nanocomposites have been developed which contain chemically modified organoclay materials. Due to the high aspect ratio of the organoclays selected for the formation of polyester nanocomposites, frequently a tortuous path is created which the penetrating gas must follow to diffuse through this material, thus markedly increasing the barrier of the polyester material.

One of the primary processes which has been used to form bottles and containers from polyester nanocomposites is stretch blow molding (SBM). With this blow molding process, usually the preform is molded at a temperature about 20 to 50 degrees Celsius above the glass transition temperature of the polyester. Molding in this range of temperature, it has been very difficult to form a bottle or container which did not exhibit substantial opacity or cloudiness in the sidewall. It is very desirable to have processing methods available which allow the formation of polyester nanocomposite containers possessing both high clarity and barrier.

There are many examples in the patent literature of the formation of polymer/clay nanocomposites containing, for example, Nylon-6 and alkyl ammonium treated montmorillonite. Some patents describe the blending of up to 60 weight percent of intercalated clay materials with a wide range of polymers including polyamides, polyesters, polyurethanes, polycarbonates, polyolefins, vinyl polymers, thermosetting resins and the like. WO 93/04117 discloses a wide range of polymers melt blended with up to 60 weight percent of dispersed platelet particles. Although the use of polyesters is disclosed, polyester/platelet compositions of a specific molecular weight are not disclosed. WO 93/04118 discloses composite material of a melt processable polymer and up to 60 weight percent of dispersed platelet particles. Among a wide range of thermoplastic polymers indicated, polyesters are included. U.S. Pat. No. 5,552,469 describes the preparation of intercalates derived from certain clays and water soluble polymers such as polyvinyl pyrrolidone, polyvinyl alcohol, and polyacrylic acid. The specification describes a wide range of thermoplastic resins including polyesters and rubbers which can be used in blends with these intercalates. U.S. Pat. No. 4,889,885 describes the polymerization of various vinyl monomers such as methyl methacrylate and isoprene in the presence of sodium montmorillonite. In Example 11, it describes the polycondensation of dimethyl terephthalate and ethylene glycol in the presence of 33 weight percent of a montmorillonite clay in water (for 6.2 final weight percent of clay in the polyester resin).

JP Kokai patent no. 9-176461 discloses polyester bottles wherein the polyester contains swellable laminar silicate. WO 97/31057 discloses polymer composite having dispersed therein inorganic material such as clay which is separated with an inorganic intercalant. WO 97/31973 discloses producing a composite material by mixing a potassium ionomer in which ethylene methacrylate copolymer is either partially or completely neutralized with an organic polymer. However, the foregoing references produce materials comprising very large tactoids and little if any dispersion of individual platelet particles. Nor do any of the references disclose nanocomposite compositions having other specific properties such as melt strength and viscosity and high I.V. which are necessary to produce containers by any method.

For the formation of molded articles from polyester nanocomposites, little specific prior art was found to be in existence. In U.S. Pat. No. 5,102,948, a polyamide/clay composite was formulated in such a manner that the material was resistant to whitening during stretching. With polyester resins, no such prior art has been found.

As an initial attempt to process polyester based nanocomposites, variations of conventional techniques for polyester processing have been utilized in our laboratory to form the objects desired. For blow molding polyester resins into bottles, jars and other containers, several processes are well established: SBM, extrusion blow molding (EBM), and injection blow molding (IBM). Polyester/clay nanocomposites contain dispersed clay particles which frequently also act as nucleation agents for the polyester material. Using SBM to mold bottles of polyester/clay composites frequently imparts sufficient orientation to the wall of the bottle to prevent creep when the contents of the bottle is under pressure. However, initial attempts to employ SBM with these materials consistently yielded bottles which exhibited a hazy or turbid sidewall. Only when high melt strength polyester/clay composite resins were prepared which were processable at high melt temperatures, have containers with clear sidewalls been obtained from these materials.

DESCRIPTION OF THE FIGURE

FIG. 2 is a plot showing the melt strength as a function of I.V. for polyester-platelet composites and polyesters without any platelet particles.

DESCRIPTION OF THE INVENTION

Figure 1:
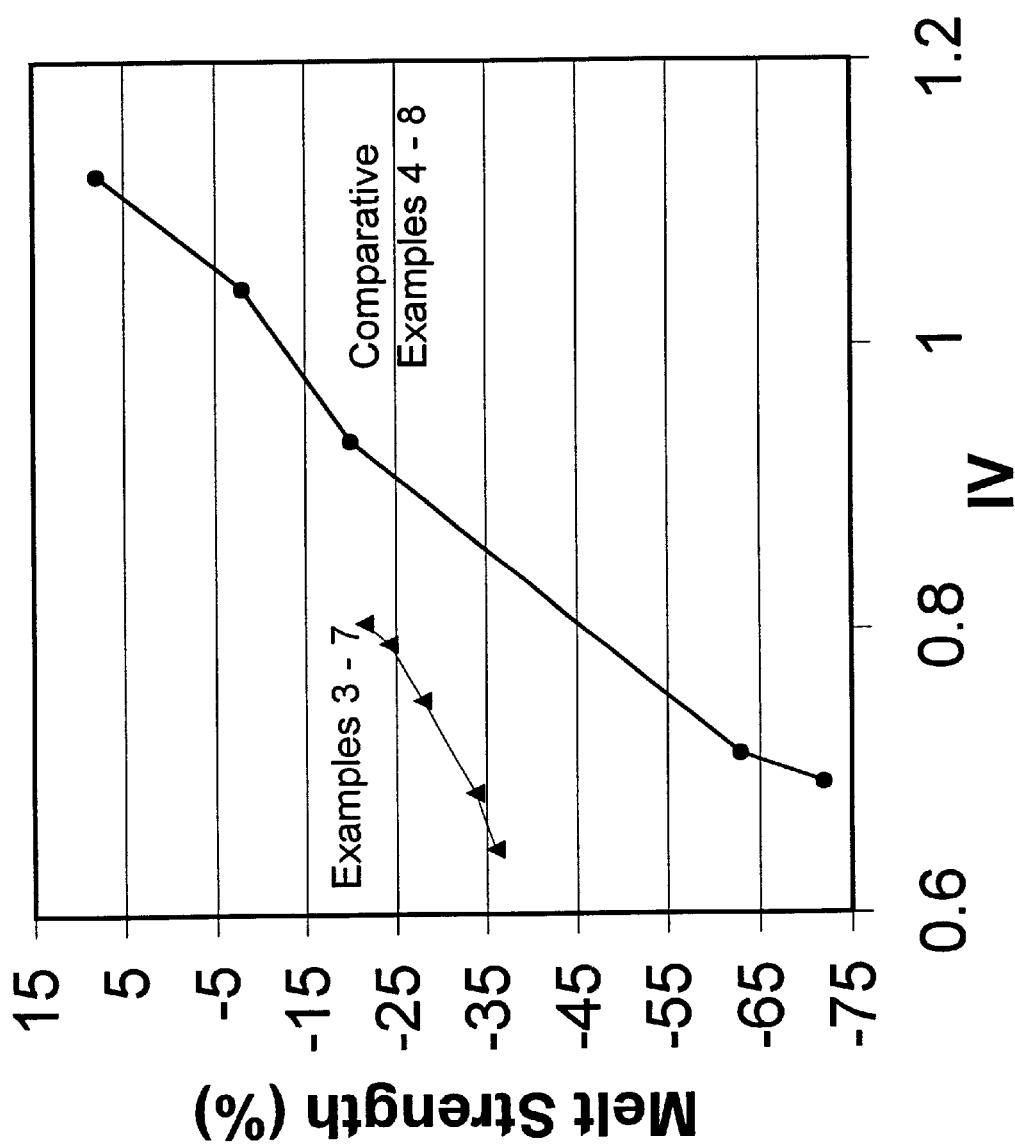
FIG. 1 is a plot showing the melt viscosity at 280° C. as a function of I.V. for polyester-platelet composites and polyesters without any platelet particles.

This invention relates to new polyester compositions, novel processes to prepare molded articles from these new polyester compositions, and novel containers fabricated from polyester/clay composites for food and beverages. The processing methods employed in this invention enable containers to be formed which exhibit excellent clarity.

Specifically, the present invention relates to a process comprising forming a parison from a composite composition comprising about 0.01 to about 25 weight % platelet particles dispersed in at least one polyester at a processing temperature which is at least 50° C. above the Tg of said polyester; and molding said parison into a clear, thin walled article. To reach the optimum blowing temperature, frequently the processing temperature for the blowing of the resin was reached by starting in the melt (especially with crystallizable polyesters) and then lowering the resin to the desired processing temperature. For all polyester/clay composite resins, the processing temperature should be at least 50° C. above and preferably more than 100° C. above the glass transition of the polyester component.

Generally the compositions which are useful in the present invention comprise about 0.01 to about 25 weight percent platelet particles dispersed in at least one polyester. A variety of methods are useful for the preparation of these resins including, synthesis, extrusion formulation and compounding, and solid state advancing of the polyester resin to achieve the desired molecular weight for the polyester component.

Platelet Particles

The compositions of the present invention comprise between about 0.01 and about 25 wt %, preferably between 0.5 and 25 wt %, more preferably between 0.5 and 15 wt % and most preferably between 0.5 and 10 wt % of certain platelet particles derived from organic and inorganic clay materials. The amount of platelet particles is determined by measuring the amount of ash of the polyester-platelet compositions when treated in accordance with ASTM D5630-94, which is incorporated herein by reference.

The platelet particles of the present invention have a thickness of less than about 2 nm and a diameter in the range of about 10 to about 1000 nm. For the purposes of this invention measurements refer only to the platelet particle and not any dispersing aids or pretreatment compounds which might be used. Suitable platelet particles are derived from clay materials which are free flowing powders having a cation exchange capacity between about 0.3 and about 3 meq/g and preferably between about 0.8 and about 1.5 meq/g. Examples of suitable clay materials include mica-type layered phyllosilicates, including clays, smectite clays, sodium montmorillonite, sodium hectorite, bentonites, nontronite, beidelite, volonsloite, saponite, sauconite, magadiite, kenyaite, synthetic sodium hecotorites, and the like. Clays of this nature are available from various companies including Southern Clay Products and Nanocor, Inc. Generally the clay materials are a dense agglomeration of platelet particles which are closely stacked together like cards.

Other non-clay materials having the above described ion exchange capacity and size, such as chalcogens may also be used as the source of platelet particles under the present invention. These materials are known in the art and need not be described in detail here.

The prior art has defined the degree of separation of the platelet particles based on peak intensity and basal spacing, or lack thereof, as determined by X-ray analyses of polymer-platelet composites. However, in polyester composites X-ray analysis alone does not accurately predict the dispersion of the platelet particles in the polyester nor the resultant barrier improvement. TEM images of polyester-platelet composites show that platelet particles which are incorporated into at least one polyester exist in a variety of forms, including, but not limited to invdividual platelets (the exfoliated state), disordered agglomerates of platelets, well ordered or stacked aggregates of platelets (tactoids) and aggregates of tactoids. X-ray analysis only provides information related to the well ordered aggregates, which are only a small portion of the platelet particles which are present.

Without being bound by any particular theory, it is believed that the degree of improved barrier depends upon the aspect ratio of the resulting particle platelets and aggregates, the degree to which they are dispersed or uniformly distributed and the degree to which they are ordered perpendicular to the flux of the permeant. To obtain the improvements in gas permeability and the enhanced melt visocity disclosed in the present invention it is necessary that the platelet particles be dispersed in the polyester such that the majority, preferably at least about 75% and perhaps as much as at least about 90 or more of the platelet particles have a thickness in the shortest dimension of less than about 20 nm and preferably less than about 10 mn as estimated from TEM images representative of the bulk of the composite. Polyester-platelet composites containing more individual platelets and fewer aggregates, ordered or disordered are most preferred.

Dispersions containing a high level of individual platelet particles have not been previously disclosed. Previous patents and applications have claimed to produce polyesters containing intercalated or exfoliated platelet particles, as indicated by large basal spacings or the lack of a detectable basal spacing by X-ray, however, the results could not be reproduced. With the exception of WO 93/04118 (which does not posses suitable I.V. and melt viscosity), the polyester/platelet compositions of the prior art are believed to be dispersions of aggregates with large thickness, typically greater than about 20 nm. While the aggregates were well spaced, very few individual platelets and tactoids or particles with thicknesses less than about 20 nm could be found. Without achieving a good dispersion and small particle size improved barrier and visual properties cannot be achieved.

Improvements in gas barrier also increase as the amount of platelet particles in the polyester increases. While amounts of platelet particles as low as 0.01% provide improved barrier (especially when well dispersed and ordered), compositions having at least about 0.5 wt % of the platelet particles are preferred because they display the desired improvements in gas permeability.

Generally, it is desirable to treat the selected clay material to separate the agglomerates of platelet particles to individual platelet particles and small tactoids prior to introducing the platelet particles to the polyester. Predispersing or separating the platelet particles also improves the polyester/platelet interface. Any treatment that achieves the above goals may be used. Examples of useful treatments include intercalation with water soluble or water insoluble polymers, organic reagents or monomers, silane compounds, metals or organometallics, organic cations to effect cation exchange, and their combinations.

Examples of useful pretreatment with polymers and oligomers include those disclosed in U.S. Pat. Nos. 5,552,469 and 5,578,672, incorporated herein by reference. Examples of usefull polymers for intercalating the platelet particles include polyvinyl pyrrolidone, polyvinyl alcohol, polyethylene glycol, polytetrahydrofiuran, polystyrene, polycaprolactone, certain water dispersable polyesters, Nylon-6 and the like.

Examples of useful pretreatment with organic reagents and monomers include those disclosed in EP 780,340 A1, incorporated herein by reference. Examples of useful organic reagents and monomers for intercalating the platelet particles include dodecylpyrrolidone, caprolactone, aprolactam, ethylene carbonate, ethylene glycol, bishydroxyethyl terephthalate, dimethyl terephthalate, and the like or mixtures thereof.

Examples of useful pretreatment with silane compounds include those treatements disclosed in WO 93/11190, incorporated herein by reference. Examples of useful silane compounds includes (3-glycidoxypropyl)trimethoxysilane, 2-methoxy (polyethyleneoxy)propyl heptamethyl trisiloxane, octadecyl dimethyl (3-trimethoxysilylpropyl) ammonium chloride and the like.

Numerous methods to modify layered particles with organic cations are known, and any of these may be used in the process of this invention. One embodiment of this invention is the modification of a layered particle with an organic cation by the process of dispersing a layered particle material in hot water, most preferably from 50 to 80° C., adding an organic cation salt or combinations of organic cation salts (neat or dissolved in water or alcohol) with agitation, then blending for a period of time sufficient for the organic cations to exchange most of the metal cations present in the galleries between the layers of the clay material. Then, the organically modified layered particle material is isolated by methods known in the art including, but not limited to, filtration, centrifugation, spray drying, and their combinations. It is desirable to use a sufficient amount of the organic cation salt to permit exchange of most of the metal cations in the galleries of the layered particle for organic cations; therefore, at least about 1 equivalent of organic cation salt is used and up to about 3 equivalents of organic cation salt can be used. It is preferred that about 1.1 to 2 equivalents of organic cation salt be used, more preferable about 1.1 to 1.5 equivalents. It is desirable, but not required, to remove most of the metal cation salt and most of the excess organic cation salt by washing and other techniques known in the art. The particle size of the organoclay is reduced in size by methods known in the art, including, but not limited to, grinding, pulverizing, hammer milling, jet milling, and their combinations. It is preferred that the average particle size be reduced to less than 100 micron in diameter, more preferably less than 50 micron in diameter, and most preferably less than 20 micron in diameter.

Useful organic cation salts for the process of this invention can be represented as follows:

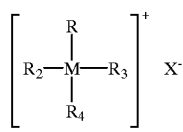

Wherein M represents either nitrogen or phosphourous; X⁻ represents an anion selected from the group consisting of halogen, hydroxide, or acetate anions, preferably chloride and bromide; $R_1$, $R_2$, $R_3$ and $R_4$ are independently selected from organic and oligomeric ligands or may be hydrogen. Examples of useful organic ligands include, but are not limited to, linear or branched alkyl groups having 1 to 22 carbon atoms, aralkyl groups which are benzyl and substituted benzyl moieties including fused ring moieties having linear chains or branches of 1 to 22 carbon atoms in the alkyl portion of the structure, aryl groups such as phenyl and substituted phenyl including fused ring aromatic substituents, beta, gamma unsaturated groups having six or less carbon atoms, and alkyleneoxide groups having 2 to 6 carbon atoms. Examples of useful oligomeric ligands include, but are not limited to, poly(alkylene oxide), polystyrene, polyacrylate, polycaprolactone, and the like.

Examples of useful organic cations include, but are not limited to, alkyl ammonium ions, such as dodecyl ammonium, octadecyl ammonium, bis(2-hydroxyethyl) octadecyl methyl ammonium, octadecyl benzyl dimethyl ammonium, tetramethyl ammonium, and the like or mixtures thereof, and alkyl phosphonium ions such as tetrabutyl phosphonium, trioctyl octadecyl phosphonium, tetraoctyl phosphonium, octadecyl triphenyl phosphonium, and the like or mixtures thereof. Illustrative examples of suitable polyalkoxylated ammoniium compounds include those available under the trade name Ethoquad or Ethomeen from Akzo Chemie America, namely, Ethoquad 18/25 which is octadecyl methyl bis(polyoxyethylene[15]) ammonium chloride and Ethomeen 18/25 which is octadecyl bis (polyoxyethylene[15])amine, wherein the numbers in brackets refer to the total number of ethylene oxide units. The most preferred organic cation is octadecyl methyl bis (polyoxyethylene{15}) ammonium chloride.

If desired, the treated or untreated platelet particles may be further separated into a dispersing medium prior to or during contact with polyester monomers. Many such dispersing aids are known, covering a wide range of materials including water, alcohols, ketones, aldehydes, chlorinated solvents, hydrocarbon solvents, aromatic solvents, and the like or combinations thereof. One especially useful embodiment is exfoliation or dispersion of treated or untreated platelet particles into ethylene glycol with the addition of one or more of the above swelling aids or intercalating compounds. The particles are dispersed as individual platelet particles and tactoids. The ethylene glycol/platelet particle blends are usually high viscosity gels at zero shear, but they undergo shear thinning and flow under shear stresses caused by stirring and pumping. Other examples of predispersion of modified or unmodified particles include, but are not limited to, those disclosed in EP 747,451 A2 and U.S. Pat. No. 4,889,885, which are incorporated herein by reference.

It should be appreciated that on a total composition basis dispersing aids and/or pretreatment compounds which are used may account for significant amount of the total composition, in some cases up to about 30 weight %. While it is preferred to use as little dispersing aid/pretreatment compounds as possible, the amounts of dispersing aids and/or pretreatment compounds may be as much as about 8 times the amount of the platelet particles.

Polyesters

The polyester component of the compound of the present invention is present in amounts between about 99.99 weight percent to about 75 weight percent, preferably between 99.5 and about 75 wt %, more preferably 99.5 to about 85 wt % and most preferably between 99.5 and about 90 wt %.

Suitable polyesters include at least one dibasic acid and at least one glycol. The primary dibasic acids are terephthalic, isophthalic, naphthalenedicarboxylic, 1,4-cyclohexanedicarboxylic acid and the like. The various isomers of naphthalenedicarboxylic acid or mixtures of isomers may be used but the 1,4-, 1,5-, 2,6-, and 2,7-isomers are preferred. The 1,4-cyclohexanedicarboxylic acid may be in the form of cis, trans, or cis/trans mixtures. In addition to the acid forms, the lower alkyl esters or acid chlorides may be also be used.

The dicarboxylic acid component of the polyester may optionally be modified with up to about 50 mole percent of one or more different dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 7 to 12 carbon atoms. Examples of suitable dicarboxylic acids include phthalic acid, isophthalic acid, naphthalene-2,6-dicarboxylic acid, cyclohexanedicarboxylic acid, cyclohexanediacetic acid, diphenyl4,4'-dicarboxylic acid, succinic acid, glutaric acid, adipic acid, azelaic acid, sebacic acid, and the like. Polyesters may be prepared from one or more of the above dicarboxylic acids.

Typical glycols used in the polyester include those containing from two to about ten carbon atoms. Preferred glycols include ethylene glycol, 1,4-butanediol, 1,6-hexanediol, 1,4-cyclohexanedimethanol, diethylene glycol and the like. The glycol component may optionally be modified with up to about 50 mole percent, of one or more different diols. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(2-hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like. Polyesters may be prepared from one or more of the above diols.

The resin may also contain small amounts of trifunctional or tetrafunctional comonomers to provide controlled branching in the polymers. These monomers can be extremely beneficial for imparting enhanced melt strength to a polyester at a lower average molecular weight. Such comonomers include trimellitic anhydride, trimethylolpropane, pyromellitic dianhydride, pentaerythritol, trimellitic acid, trimellitic acid, pyromellitic acid and other polyester forming polyacids or polyols generally known in the art.

Also small amounts of multifunctional polyols such as trimethylolpropane, pentaerythritol, glycerol and the like may be used if desired. When using 1,4-cyclohexanedimethanol, it may be the cis, trans or cis/trans mixtures.

Also, although not required, additives normally used in polyesters may be used if desired. Such additives include colorants, pigments, carbon black, glass fibers, fillers, impact modifiers, antioxidants, stabilizers, flame retardants, reheat aids, acetaldehyde reducing compounds and the like.

The polyester/dispersed platelet compositions should be crystallizable to an extent that is sufficient to prevent sticking during subsequent treatment such as solid stating.

The polyesters of the present invention may be made by any process which is known in the art. Typically polyesters are made via well known polycondensation processes.

The polyester-platelet particle composite compositions of the present invention may be made by a wide variety of the process steps which are disclosed herein. For example, the platelet particles may be added to the polyester before (mixed in with one of the monomer components, such as ethylene glycol) melt polymerization, during melt polymerization or after (such as via compounding. The polyester-platelet particle composite material may be polymerized from the melt and used with or without further treatment such as, but not limited to solid stating. Alternatively the polyester-platelet composite materials may be molded directly from melt polymerization. In fact, due to the higher melt strength of the polyester-platelet particle composites, molding directly from melt polymerization is even more beneficial than with polyesters which do not contain platelet particles because less thermal history is required to achieve the desired melt strength. The reduced thermal history provides bottles with better color (less yellow hues) and lower concentrations of undesirable side products, such as acetaldehyde.

Process

The process of the present invention comprises the step of forming a parison from a polymer/platelet particle composition at a temperature which is at least 50° C. higher than the Tg of said polymer/platelet particle composition; and molding said parison into a shaped article.

When a high temperature blowing process such as EBM is employed for forming the desired vessel, the melt strength, and thus the molecular weight, of the molding resin must be sufficiently high for a suitable parison to be formed. The polyester/clay composite must, first of all, be readily melt processable. In addition, the melt must possess sufficient strength for the parison to support its own weight. With the dispersion of an organoclay in a polyester resin, the desired melt strength can usually be obtained even when the molecular weight of the polyester is at a lower value than with the neat material (FIG. 1). Since the dispersion of the clay layers into the polyester melt often improves the melt viscosity and the other properties of the resin, the clay can be considered an aid for high temperature processing methods such as EBM. In addition, branching agents, such as glycols or acids possessing a functionality of three or greater, can be reacted into the polyester component of the nanocomposite for the optimum balance of processability and melt strength. The various components of the present invention are disclosed in detail, below.

Blow Molding from Polyester Melts

Many procedures have been established for molding a thermoplastic material into a bottle, jar or other container. With polyesters, some of the more common processing methods include stretch blow molding, SBM; injection blow molding, IBM and extrusion blow molding EBM. Other processing methods such as rotomolding might also be employed. Each of these processing methods allows a polyester of the proper composition and molecular weight to be formed into a clear, durable containers which are valuable for a variety of uses. When a polyester/clay nanocomposite is molded into a vessel such as a bottle or a jar, turbidity is commonly present in the sidewall of the container. Though this turbidity may have several different causes, with stretch blow molding in the conventional manner, it is frequently difficult to avoid the presence of some haze in the molded object.

In the present invention, it was discovered that polyester-platelet particle composite bottles which exhibit high clarity can be formed by employing a process comprised of blow molding or processing at a temperature well above the glass transition temperature, generally by more than 50° C. and preferably by more than 100° C. Moreover, the blowing temperature is frequently selected so that the occurrence of crystallization does not complicate the blowing process. The enhanced melt strength (and rheology) of the polyester-platelet particle composite materials should allow the blow molding in a wider range of processing temperature.

Suitable molding equipment is well known in the art. IBM equipment is available from UNILOY, WHEATON and JOMAR, EBM equipment is available from Bekum, Battenfield Fisher and UNILOY and stretch blow molding equipment is available from companies such as Husky, Sidel, Aoki and Nissei.

EXAMPLES

Example 1

A copolyester of polyethylene terephthalate (PETG) (derived from 100 m % terephthalic acid, 88 m % ethylene glycol and 12 mole % 1,4-cyclohexane dimethanol (CHDM), amorphous K-2000, without mold release agents, available from Eastman Chemical Company, upon specific request) was dried for 72 hours at 60° C. in a desiccating oven. The PETG and Claytone APA clay from Southern Clay Products, Inc (3.3 weight % of the composite) were introduced into a Werner-Pfleiderer 30 mm twin screw extruder (ZSK-30) with an L/D of approximately 34 and a general compounding screw design. The PETG and clay were compounded at a melt processing temperature of 255° C. and a screw speed of 200 rpm. After extrusion, the inherent viscosity (IV) for the nanocomposite material was determined to be 0.59 dL/g in a 60/40 (w/w) phenol/tetrachloroethane solution at 25° C.

Example 2

PETG composite from example 1 was crystallized in a stainless steel double cone rotating dryer. This unit is heated by a Marlotherm S (heat transfer fluid) system and is equipped with a water cooled heat exchanger. The unit was purged with a 10 scfh (standard $ft^3$/hr) nitrogen flow. The polyester-platelet particle composite was added and the unit was heated to 150° C. and held for 6 hours. The unit was then cooled and the polymer discharged. After crystallization was complete the material was solid state polymerized to increase the molecular weight of the PETG component.

Solid-stated polymerization was carried out in a static bed reactor at 198° C. for 300 hours. The reactor has a stainless steel basket with a sintered metal, fritted disk in the bottom of the basket for a uniform distribution of heated nitrogen. The reactor was heated to the desired temperature by a Marlotherm heating system equipped with a heat exchanger for cooling. The nitrogen was heated to the desired temperature by an electric heater. After 300 hours at 198° C., the unit was cooled and the polymer discharged. The resulting material had an I.V. of 0.82 dL/g.

The dried resins were extrusion blow molded on a Bekum EBM-unit. The extruder contains an 80 millimeter diameter, New Castle feed screw. The materials were extruded at 235° C. and a mold was utilized for a 12 ounce syrup bottle with no handle. A mold temperature of 49° C. and a total cycle time of 10.78 seconds were employed. Several bottles were made from this material. The 12 ounce bottles made from the nanocomposite resin exhibited a high degree of clarity. These bottles also exhibited an amber color due to the presence of impurities in the clay. The characterization of their visual appearance is given in Table 1.

The oxygen permeability of the sidewall of each of these bottles was determined. The sidewall of the nanocomposite bottle exhibited an oxygen permeability of 7.9 cc-mil/100 $in^2$ day atm.

Comparative Example 1

PETG copolyester used in Example 1 without any clay material was crystallized in the stainless steel double cone rotating dryer described in Example 2. Initially, 20 pounds of the PETG copolyester was charged to the unit. The unit was heated to 150° C. and held for 45 minutes. The unit was then cooled to 50° C. An additional 80 pounds of polymeric material was charged to the unit. The unit was again heated to 150° C. and held for 6 hours. After 6 hours it was cooled and the polymer discharged. After crystallization was complete the resulting inherent viscosity (IV) of the PETG copolymer was 0.70 dL/g in a 60/40 weight percent mixture of phenol/1,1,2,2-tetrachloroethane. Extrusion blow molding was employed as described in Example 2 to form bottles. The characterization of the visual appearance of the bottles is given in Table 1. The oxygen permeability of the sidewall of each of these bottles was determined to be 10.9 cc-mil/100 $in^2$ day atm. Thus bottles which are extrusion blow molded in accordance with the process of the present invention display good visual properties and a 27% improvement in the barrier over that of the neat copolyester (Example 2).

Comparative Example 2

PETG composite of Example 1 was dried by annealing in a vacuum oven overnight at 60° C. and then crystallized by stepping up over seven hours to a final temperature of 180° C. Bottles were stretch blow molded as follows. Preforms for half liter bottles were formed by injection molding on a Boy 22D at approximately 280° C. Half liter bottles were then formed by stretch blow molding at a melt temperature of approximately 120 to 130° C. The stretch blow molded bottles of this Example were very hazy. The characterization of their visual appearance is given in Table 1.

Assessment of Clarity:

The haze and opacity of the Example 2 EBM bottles were characterized and compared both to the copolyester control (Comparative Example 1) and to nanocomposite materials which were blown at a temperature approximately 40° C. above the glass transition temperature of the copolyester (Comparative Example 2). The haze was determined examining the total transmission by ASTM D-1003. The opacity of these materials was analyzed comparing the ratios of the diffuse reflectance first with a white reflective tile and then with a flat black tile backing the sample. These results are presented in Table 1. The bottles formed by EBM at 230 to 240° C. (Example 2) clearly exhibited superior clarity to the samples blow molded at 120 to 130° C. (Comparative Examples 2 and 3). Thus, by utilizing a high temperature blow molding process, for the first time high clarity bottles have been obtained with clay/polyester nanocomposites.

TABLE 1

Haze Characterization in Polyester Nanocomposite Bottles

| Example # | molding method | % platelet | Haze | % Opacity | permeability* |
|---|---|---|---|---|---|
| Example 2 | EBM | 3.3 | 8.8 | 12.5 | 7.9 |
| Comp. Example 2 | EBM | 0 | 1.8 | 10.8 | 10.9 |
| Comp. Example 3 | SBM | 3.3 | 62.1 | 52.2 | na |

*cc-mil/100 $in^2$ day atm

Bottles formed by the present invention (Example 2) display surprisingly good clarity (low haze and opacity). This is clearly shown by comparision with Comparative Example 3, which was blown by stretch blow molding at temperatures which were less than 50° C. above the Tg of the polyester. The bottle blown according to the process of the present invention was nearly 8 times less hazy (8.8 vs. 62.1) thanthe bottle of Comparative Example 3. While the haze values for the bottles of the present invention are not as good as those for polyester which does not contain platelet particles, they are still transparent to the human eye. Haze values of less than 20 are desireable, less than 15 more desirable and less than about 10 are most desirable. Moreover, some of the haze observed in the bottle of Example 2 are to impurities which were present in the clay.

Examples 3–7

PETG composite of Example 1 was crystallized by annealing in a convection oven at 150° C. for 25 minutes and at 180° C. for 15 minutes. This material was then solid state polymerized at 198° C. in a glass column heated with refluxing ethylene glycol. During the solid stating process, which totaled about 300 hours, five samples were taken at different times to span a range of molecular weights.

The melt strength of each sample was determined at 265° C. using an Instron Capillary Rheometer. A strand of polymer was extruded through a capillary of 0.1 inch diameter and 0.25 inch length. A plunger speed of 2 cm/minute was employed. The diameter of the strand was measured 6 inches from the thicker end. Generally, there is attenuation in the diameter of the strand due to gravitational forces acting on the molten extrudate. Greater attenuation of the diameter of the strand implies a lower melt strength. The melt strength is defined as follows:

melt strength=(strand diameter at 6 inch–capillary diameter)/capillary diameter*100

The I.V was measured in a 60/40 weight percent mixture of phenol/1,1,2,2-tetrachloroethane. FIG. 2 shows the melt strength as a function of I.V. for Examples 3–7.

Comparative Examples 4–8

PETG copolymer (12% CHDM) was crystallized by annealing in a convection oven at 150° C. for 2.5 hours. This material was then solid state annealed starting at 180° C. and increasing stepwise to 198° C. During the solid stating process, which totaled about 100 hours, five samples were taken at different times to span a range of molecular weights. The melt strength was determined usmg an Instron Capillary Rheometer in the same manner employed for Examples 3–7. In FIG. 2, the melt strength values for Examples 3–7 and Comparative Examples 4–8 are shown as a function of IV. Table 2 reports the I.V. and melt strength for each sample measured.

TABLE 2

| Example | I.V. (dL/g) | Melt Strength (%) |
|---------|-------------|-------------------|
| 3 | 0.65 | −36 |
| 4 | 0.69 | −34 |
| 5 | 0.75 | −28 |
| 6 | 0.79 | −24 |
| 7 | 0.81 | −22 |
| CE4 | 0.70 | −72 |
| CE5 | 0.71 | −63 |
| CE6 | 0.93 | −20 |
| CE7 | 1.04 | −8 |
| CE8 | 1.12 | 8 |

It was very surprising to find such a large increase in melt strength at similar I.V. For example, the melt strength of the composite of the present invention at 0.69 I.V. is twice as good (−36) as the melt strength (−72) of the same polyester at a nearly identical I.V. (Comparative Example 4, I.V. of 0.7). The magnitude of this difference is very surprising and extremely significant. Generally EBM is conducted at I.V.s which are in excess of 0.9 dL/g. However, polyester-platelet composites of that I.V. are difficult to produce because the melt viscosities of the composites of the present invention are very high, severely limiting the I.V. which can be attained through melt polymerization. Thus, the discovery that clear bottles could be extrusion blow molded from polyester-platelet composites at I.V.s far lower than generally used for non-modified polyesters was quite surprising.

Example 8

To a 18 gallon (68 liter) stainless steel batch reactor, with intermeshing spiral agitators, was added 13.29 kilograms (68.59 moles) of dimethyl terephthalate, 3.53 kilograms (57.04 moles) of ethylene glycol, 0.79 kilograms (5.49 moles) of 1,4-cyclohexanedimethanol, 10.95 grams of a butanol solution containing the titanium catalyst and 227.0 grams of an ethylene glycol solution containing the manganese catalyst. Added to this mixture was 2.50 kilograms of an experimental gel from Nanocor, Inc. designated #75 containing 10.9% sodium montmorillonite, 82.36% ethylene glycol, 2.7% water, and 4.04% polyvinylpyrollidone Nanomer PVP-B gel, available from Nanocor, Inc. The reactor was heated to 200° C. and held for 2 hours with agitation. The temperature was increased to 220° C. and held for 1 hour. The phosphorus catalyst was added and the temperature was maintained at 220° C. for 10 minutes. 805 grams were then added of an ethylene glycol solution containing the cobalt and antimony catalyst and the temperature was increased to 285° C. When the melt temperature reached 270° C., vacuum was applied at a rate of 13 mm per minute. When the pressure had dropped to 1 mm and the melt temperature was 285° C., the polymer was let down to a nitrogen purge. The polymer was extruded into metal pans and ground to pass a 3 mm screen. The polymer had an inherent viscosity of 0.25 dL/g, a zero shear melt viscosity of 6600 P, and GPC $M_w$=11400, $M_n$=5700, $M_z$=18000. The polymer contained 1.6 mole % diethylene glycol, 8.1 mole % CHDM, 20 ppm of Ti, 55 ppm of Mn, 80 ppm of Co, 230 ppm of Sb and 110 ppm of P.

The PETG composite was solid state polymerized in a fluidized bed reactor at 215° C. for 60 hours to an inherent viscosity of 0.93 dL/g, a zero shear melt viscosity of 270,000 P and a melt strength at 250° C. of +2.8%.

The PETG composite was extrusion blow molded on a Bekum EBM-unit at 248° C. and to form a 12 ounce Syrup bottle with no handle. The extruder had an 80-mm diameter, New Castle feed screw. Total cycle time of 10.5 seconds was utilized and the mold was cooled using tap water at 23° C. The 12 ounce bottle was clear with an amber color due to impurities present in the clay. The crystallinity of polyester composite was less than 5%. The bottle sidewall was tested for oxygen permeability at 23° C. using a Modem Control (MOCON) Oxtran 10/50A-permeability tester. Test gases were passed through water bubblers, resulting in about 75% relative humidity. The haze was determined for the total transmission by test method ASTM D-1003. The opacity of these materials was analyzed in which the ratio of the diffuse reflectance of the sample is determined, first with a white reflective tile backing the sample and then a black one. The oxygen permeability, haze and opacity are listed in the second column of Table 3, below.

Comparative Example 9

A sample of poly(ethylene terephthalate) as produced in Example 8 with no sodium montmorillonite was solid stated for 24 hours (control sample). It exhibited an I.V. of 0.85 dL/g and a melt strength at 250° C. of −27.2%. Bottles were molded as in Example 8. The bottles were clear and colorless. The crystallinity of polyester composite was less than 5%. The oxygen permeability, haze and opacity of the control were measured as in Example 8. The results are shown in the third column of Table 3, below.

TABLE 3

| Property | Ex. 8 | Comp. Ex. 8 |
|----------|-------|-------------|
| melt strength @ 250° C. | 2.8 | −27.2 |
| oxygen permeability (cc-mils/100 in$^2$-day-atm) | 10.1 | 11.6 |
| haze | 15.31 | 6.27 |
| opacity (%) | 12.23 | 11.78 |

As in the above Examples, the haze for bottles of the present invention (Example 8) is far better than that achieved by conventional methods Moreover the melt strength of the polyester-platelet particle composite Example 8) was nearly 10 times better than the Example without clay (Comparative Example 8). Thus, the Examples included herewith clearly show that clear bottles can be extrusion blow molded from different polyesters, containing different platelet particles.

What is claimed is:

1. A process comprising (i) forming a parison or preform from a composite composition comprising about 0.01 to about 25 weight %, based on the weight of the composition, of platelet particles dispersed in at least one polyester, wherein the majority of said platelet particles have a thickness of less than about 20 nm; and (ii) blow molding said parison into an article having a haze of less than about 15% and a gas barrier that is greater than an unmodified polyester article, at a temperature which is at least 50° C. above the glass transition temperature of said polyester.

2. The process of claim 1 wherein said blow molding temperature is at least 100° C. above said glass transition temperature.

3. The process of claim 1 wherein said article is a container.

4. The process of claim 1 wherein said composite composition further comprises between 0.5 and 25 weight % of said platelet particles.

5. The process of claim 1 wherein said composite composition further comprises between 0.5 and 15 weight % of said platelet particles.

6. The process of claim 1 wherein said composite composition further comprises between 0.5 and 10 weight % of said platelet particles.

7. The process of claim 1 wherein said platelet particles have a thickness of less than about 2 nm and a diameter in the range of about 10 to about 1000 nm.

8. The process of claim 1 wherein said platelet particles are derived from clay materials.

9. The process of claim 1 wherein said composite composition further comprises between about 99.99 weight percent to about 75 weight percent of said polyester.

10. The process of claim 9 wherein said composite composition further comprises up to about 30 weight % of at least one dispersing aid, pretreatment compound and mixtures thereof.

11. The process of claim 10 wherein said dispersing aid and or pretreatment compound is present in an amount up to about 8 times the amount of the platelet particles.

12. The process of claim 1 wherein said composite composition further comprises between about between about 99.5 and about 75 weight % of said polyester.

13. The process of claim 1 wherein said composite composition further comprises between about between about 99.5 and about 85 weight % of said polyester.

14. The process of claim 1 wherein said composite composition further comprises between about between about 99.5 and about 90 wt of said polyester.

15. The process of claim 1 further comprising the step of melting polyester-platelet particle composite pellets prior to forming said parison.

16. The process of claim 15 wherein said polyester of said pellets is solid state polymerized prior to melting.

17. The process of claim 1 wherein said composite composition is made by a method selected from the group consisting of adding said platelet particles to said polyester before melt polymerization, adding said platelet particles to said polyester during melt polymerization and adding said platelet particles to said polyester after polymerization.

18. The process of claim 1 wherein said forming process is extrusion blow molding.

* * * * *

UNITED STATES PATENT AND TRADEMARK OFFICE
CERTIFICATE OF CORRECTION

PATENT NO. : 6,337,046 B1
DATED : January 8, 2001
INVENTOR(S) : Bagrodia et al.

Page 1 of 1

It is certified that error appears in the above-identified patent and that said Letters Patent is hereby corrected as shown below:

<u>Column 14,</u>
Lines 12, 15 and 18, change "between about between about" to read
-- between about --
Line 19, change "wt of" to read -- weight % of --

Signed and Sealed this

Twenty-first Day of May, 2002

Attest:

*Attesting Officer*

JAMES E. ROGAN
*Director of the United States Patent and Trademark Office*